MULTIPLE CHARACTER COMPARATOR

Filed April 30, 1954 4 Sheets-Sheet 1

INVENTORS
Stephen M. Fillebrown & Grant W. Booth
BY Morris A. Rabkin
ATTORNEY

April 28, 1959 S. M. FILLEBROWN ET AL 2,884,616

MULTIPLE CHARACTER COMPARATOR

Filed April 30, 1954 4 Sheets-Sheet 2

INVENTORS
Stephen M. Fillebrown
& Grant W. Booth
BY Morris Rabkin
ATTORNEY

INVENTORS
Stephen M. Fillebrown
& Grant W. Booth
BY Morris A. Rabkin
ATTORNEY

INVENTORS
Stephen M. Fillebrown & Grant W. Booth
BY Morris L. Rabin
ATTORNEY

United States Patent Office 2,884,616

Patented Apr. 28, 1959

2,884,616

MULTIPLE CHARACTER COMPARATOR

Stephen M. Fillebrown and Grant W. Booth, Collingswood, N.J., assignors to Radio Corporation of America, a corporation of Delaware Application April 30, 1954, Serial No. 426,712

17 Claims. (Cl. 340—149)

Figure 1:
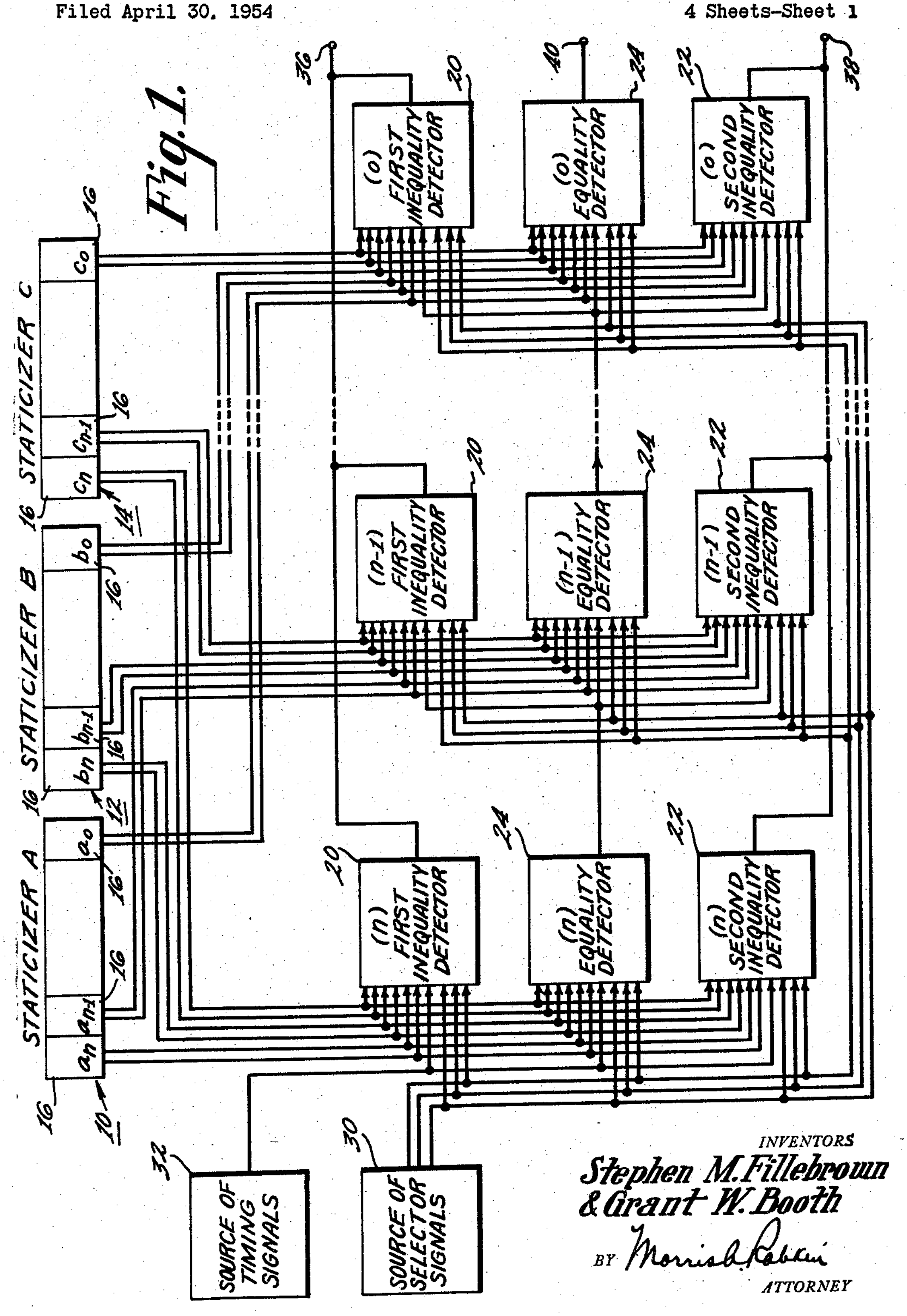

This invention relates to devices for comparing information, and particularly to a device for making comparisons between a number of characters.

Data-processing machines, including computers, are widely known and used. Computing machines are employed for solving engineering and scientific problems, and manipulating large masses of numeric information. Data-processing machines having greater commercial application may utilize punched card or perforated paper tape schemes of representing information for performing sorting and accounting functions. While these card and paper tape systems are adequate for performing many data-processing functions many other modern applications of data-processing are so extensive that these systems do not provide desired economy, speed, or storage capacity. There exists a need for electronic data-processing systems capable of performing sorting, collating, and tabulating functions, which utilize other techniques and storage mediums than those heretofore employed.

As a specific example of this need, consider conventional sorting techniques with schemes presently employed. When information is represented by perforations on a paper tape or on a punched card, the information may be regarded as being in unchangeable form. To sort this information requires either that duplicate records be created, as with paper tape, or that the sorting process be repeated a number of times with each repetition making a successive distinction as to sorting criterion as with punched cards. Greater processing speeds, and much larger information-handling capacity, may be obtained if the recording medium employed is magnetic tape, and if modern electronic techniques are utilized for representing and manipulating information.

Fundamental to data-processing systems are devices which effect comparison between alphabetic or numeric characters. This is true because decisions for any sorting or collating process are made primarily on the basis of individual characters. Comparison devices form part of the sorting apparatus in both perforated tape and punched card systems. The known devices, however, do not operate with sufficient rapidity to be employed in an electronic data-processing system.

In data-processing systems particular advantages are to be gained from the employment of the binary system of notation. Binary notation, which is widely used in the computing field, has many variations evolving from a pure binary system. In pure binary notation, it is customary to write a number (as in decimal notation) with the most significant digit at the left and digits of lesser significance arranged in succeeding positions, and in order, left to right. Digital positions represent the successive powers of two, starting with the lowest power at the right, in contrast with the successive powers of ten employed in the decimal system of notation. At each binary position only one of two values is employed, binary "1" or binary "0." The selection of a binary "1" at a binary digital position means that that power of two corresponding to that position is added in the number; the selection of a binary "0" at a binary digital position means that that power of two corresponding to that position is not added in the binary number. For example, binary number 10110 is the equivalent of decimal twenty-two, since the numbers to be added are $2^4$ (sixteen), $2^2$ (four), and $2^1$ (two). The sum of these numbers is twenty-two.

Among the advantages of employing a binary system of notation in an information-handling scheme are:

(1) Facility in representing situations and logical values which either exist or do not exist (situations which themselves have only binary possibilities).

(2) Ease in representing alphabetic as well as numeric characters.

(3) Inexpensive implementation of arrangements required for handling binary systems. Because only two possibilities exist for each digital value, digits may be represented by any arrangement which presents two alternatives, such as conduction and nonconduction in a vacuum tube or on and off positions of a switch.

A particular form of binary notation, employed here for purposes of illustration, represents alphabetic and numeric information by a predetermined number of unique binary combinations. For example, a different seven digit binary number is employed for each alphabetic or numeric character. The only numeric characters represented are those from 0 to 9, decimal numbers of ten or greater being represented by a succession of binary numbers, one for each decimal digit. Thus when used for numeric information, such a code is sometimes termed a binary decimal code. Other unique combinations of the seven binary digits may be employed to represent alphabetic characters and special symbols, each such character being distinct and different. Such a system of notation is sometimes referred to as an alpha-numeric code.

A device which compares characters represented in an alpha-numeric code is disclosed and claimed in a copending application for patent entitled "Electronic Comparator," filed August 24, 1953, Serial No. 375,869, by Philip Cheilik and assigned to the assignee of the present invention. The application describes an arrangement for comparing one character with another character to determine whether the characters are equal, or if the two characters are unequal, which of the characters is the larger. While such a system may be employed to advantage in many applications, some forms of sorting apparatus may require comparison of more than two characters. It may be desired, for example, to compare each of two characters with a third, to compare a given character with each of several other characters, or to compare each of a number of characters with each other character. To employ the arrangement disclosed in the copending application referred to would require a number of comparison devices. It would sometimes be preferable to employ a single device capable of effecting the desired comparisons.

Accordingly, an object of this invention is to provide an improved arrangement for effecting a multiplicity of comparisons.

A further object of this invention is to provide an improved circuit for comparing a character with more than one other character.

Yet another object of this invention is to provide an improved arrangement for comparing a given character with each of a plurality of other characters Still another object of this invention is to provide an improved arrangement for comparing each one of a number of characters with each other character of the number.

Another object of this invention is to provide an improved arrangement utilizing standardized components for comparing a plurality of characters more simply and rapidly than devices heretofore known.

A further object of this invention is to provide an improved circuit utilizing rectifying elements in unit blocks for comparing binary coded characters simply, rapidly, and reliably.

According to the invention, separate character comparisons are made sequentially in time by a single comparison system. A different comparison stage is employed for each digital order in the characters, each stage being responsive to the values of the digits in that one order. Each stage is also responsive to a number of selector signals. The stages compare a given pair of digits at one time, and detect and signal either equality, or, if the digits are unequal, the sense of relative inequality. The stages are coupled so that the digits are compared in the order of their significance. A signal of equality from a stage is used to effectuate comparison at the next lower stage, but a signal of inequality terminates the comparison. During comparison, digital value signals are applied continuously but selector signals are applied successively. Each selector signal serves the duel purpose of choosing the characters to be compared and disabling undesired comparisons. As each selector signal is provided, therefore, the arrangement provides an output in response to the relationship between a given pair of characters.

Figure 2:
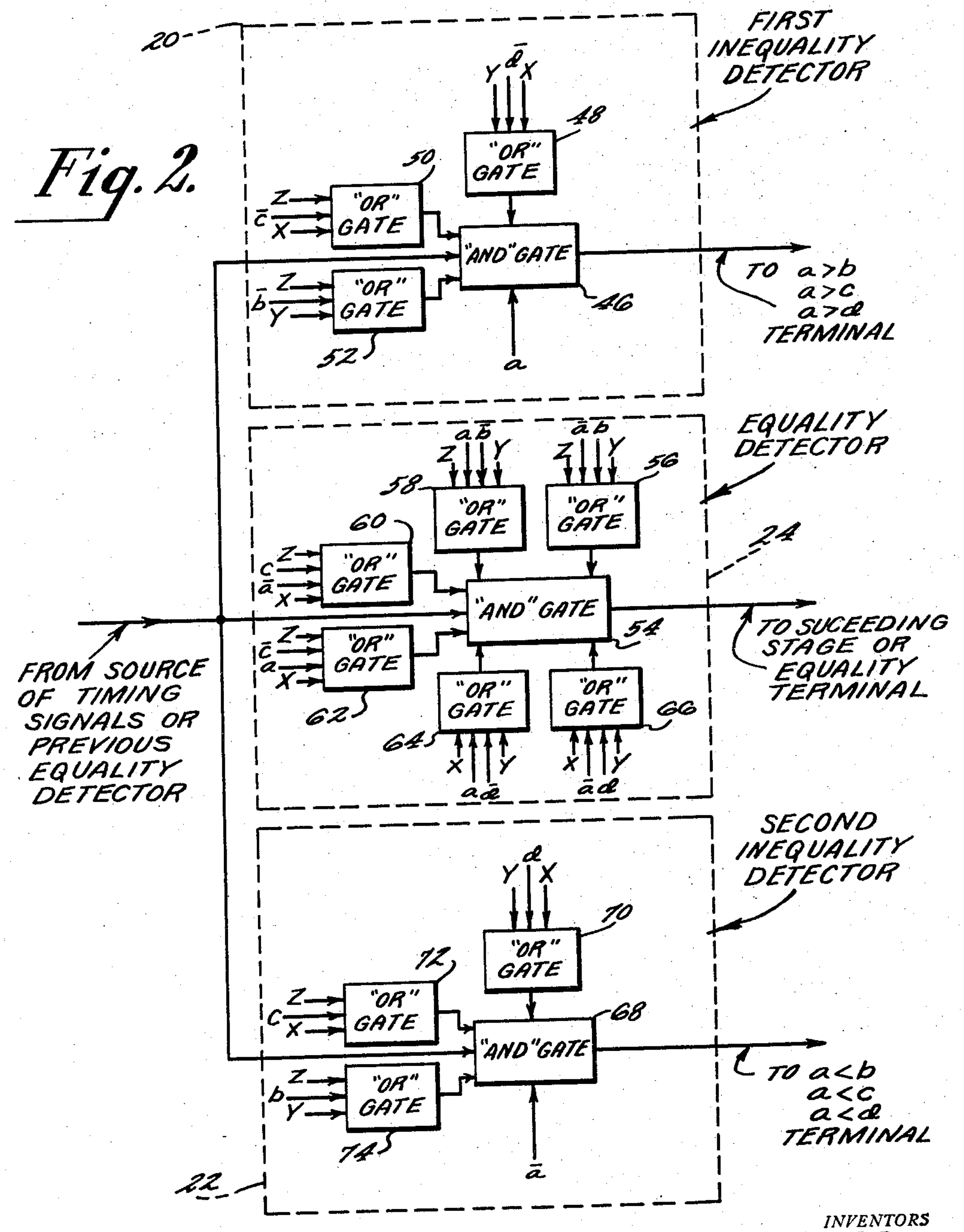
Figure 3:
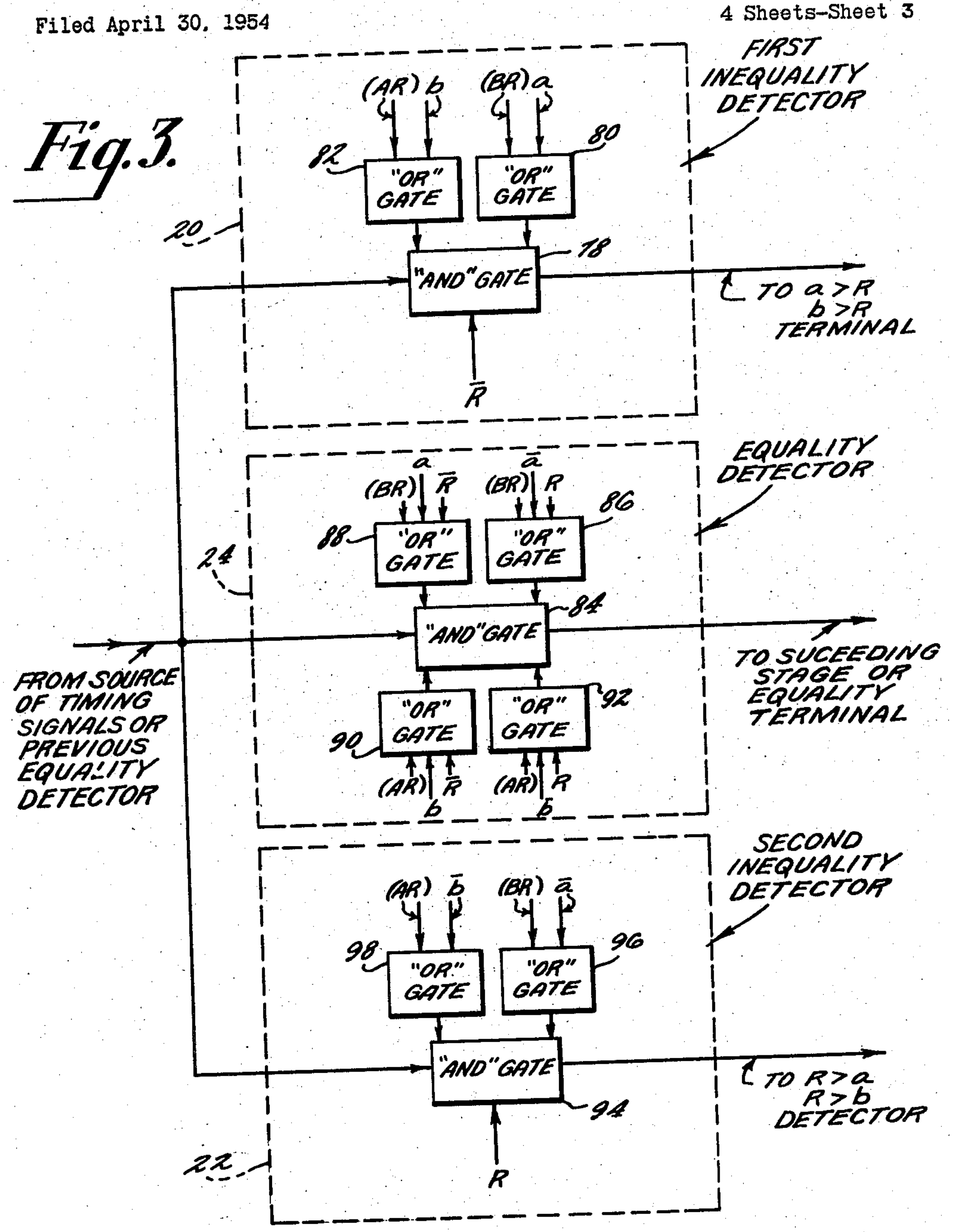
Figure 4:
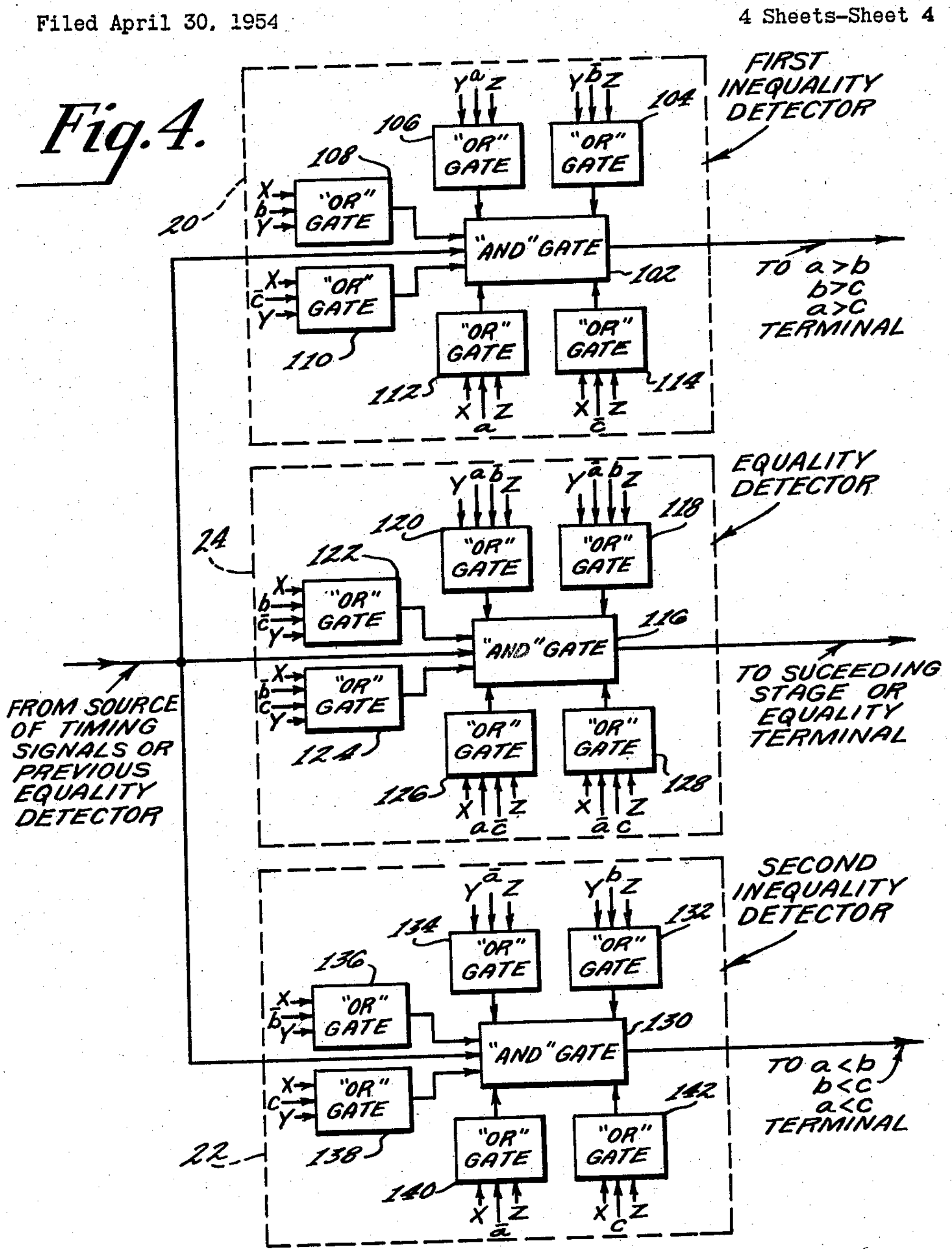

The novel features of the invention, as well as the invention itself, both to its organization and method of operation, will best be understood from the following description, when read in connection with the accompanying drawings, in which like reference numerals refer to like parts, and in which:

Fig. 1 is a block diagram representation of a generalized arrangement for practicing the invention having blocks designating equality and inequality detecting units; and Figs. 2, 3 and 4 are representations, in block diagram form, of equality and inequality detectors which may be employed in the correspondingly identified blocks of Fig. 1 to carry out different comparisons between a plurality of characters. The arrangement of Fig. 2 compares one character with each of three other characters, that of Fig. 3 compares one character with each of two other characters, and that of Fig. 4 compares any given pair of three characters.

The general arrangement of a system for practicing the invention (refer to Fig. 1) provides a framework within which particular configurations (Figs. 2, 3 and 4) may be employed.

Information which is to be processed in the system of Fig. 1 is staticized or otherwise generated in a form suitable for use in the system. A staticizer as herein employed may include any device for providing parallel signals representative of information. An example of a suitable staticizer is the one described in an article by A. D. Booth, entitled "The Physical Realization of an Electronic Digital Computer," in the magazine "Electronic Engineering" for December 1950, pp. 492–498 at p. 495.

Information to be processed in the exemplifications of the present invention may be arranged in blocks of information comprised of individual units of different orders of value. In the alpha-numeric code previously referred to, the blocks of information are characters and the units within the blocks are binary valued digits. The digits are each here assigned a different order of value, the highest order digit being of the *n*th order, and the successively lower orders being the $(n-1)$th, $(n-2)$th, . . . 0th orders.

In the generalized example of Fig. 1, three staticizers 10, 12, 14 are employed, these being staticizers for three different characters, A, B, and C. The staticizers are accordingly identified as A staticizer 10, B staticizer 12, and C staticizer 14. Each staticizer 10, 12, or 14 has a number of individual signal generating elements 16, each corresponding to a different digit of the character generated in signal form by the staticizer. The digit for each character is represented by a small letter corresponding to the letter of the character, and the order of the digit is represented by a subscript. Thus, the digits for character A are generated in elements 16$a_n$, $a_{n-1}$, . . . $a_o$ of A staticizer 10. B and C staticizers 12 and 14 similarly have digit generating elements 16 $b_n$ to $b_o$, and $c_n$ to $c_o$, respectively.

Comparisons between like individual digits of the different characters are made in digit comparing stages each having a first inequality detector 20, a second inequality detector 22, and an equality detector 24. The detectors 20, 22, 24 within each stage are coupled individually to each of the digit generating elements 16 within each of the staticizers 10, 12, 14. The detectors 20, 22, 24 are here distinguished additionally by the letter corresponding to the subscript which represents the digital order of value of the digit. For example, the equality detector 24 responsive to the highest order digits is the $(n)$ equality detector. Each detector 20, 22, 24 within each of the stages is also responsive to a source of selector signals 30 which provides different signals in separate paths.

The detectors 20, 22, 24 in the stage which is responsive to the highest power of digit $(n)$ are each coupled to a source of timing signals 32. The detectors 20, 22, 24 of each succeeding stage are coupled to the equality detector 24 in the stage responsive to the next higher order of digit. Thus, the detectors 20, 22, 24 in the $(n-1)$ stage are coupled to the $(n)$ equality detector 24. This arrangement provides a cascading coupling between the stages, or, in other terms, provides a means for actuating the stages sequentially in a descending fashion from the stage corresponding to the highest order digit.

The source of timing signals 32 and the source of selector signals 30 may be functionally coupled, within a data-processing system, to the staticizers 10, 12, 14 in such fashion that the sources of signals 30, 32 are actuated when information had been staticized in proper form. This may be accomplished by computer programming techniques which are well known to those skilled in the art and which therefore need not be set out in detail here.

A first inequality terminal 36, a second inequality terminal 38, and an equality terminal 40 are provided as means for indicating the results of the comparison. The first inequality terminal 36 is coupled to the output of each of the first inequality detectors 20 and the second inequality terminal 38 is coupled to the output of each of the second inequality detectors 22. The equality terminal 40 is coupled only to the output of the equality detector 24 responsive to the lowest order digit (the zero power digit).

Refer also to Fig. 2, which shows an arrangement within a stage of the detectors 20, 22, 24 employed for comparing one digit with each of three other digits. The arrangement of Fig. 1 comprises $n+1$ number of the arrangements of Fig. 2. The detectors 20, 22, 24 of Fig. 1 are shown enclosed within dotted lines and correspondingly identified in Fig. 2. An input is applied to each of the detectors from the source of timing signals 32 or the previous equality detector, depending upon the stage involved. Inputs to each stage from the source of selector signals 30, however, have not been drawn out but have been indicated by the letters X, Y, and Z. The extensive number of couplings employed have been thus indicated, instead of being shown in detail, for clarity.

A staticizer as herein employed provides a signal in one output conductor if the value of a digit is binary "1," and provides a signal in a second output conductor if the value of the digit is a binary "0." To clarify the drawing and explanation, binary "1" digital signal in a conductor is here designated as *a, b, c,* or *d*, corresponding to the character A, B, C, or D for which the signal is generated. The conductor which carries the signal is accordingly designated the *a, b, c,* or *d* conductor. A signal representing a binary "0" digital value is here also designated by a lower case letter, but with an added bar. Thus, a binary "0" signal for *a* is designated $\bar{a}$, and the conductor which carries the binary "0" signal is designated as the $\bar{a}$ conductor. The signals may also be said to indicate the existence of a ($a$) and the lack of existence of a ($\bar{a}$ or not $a$).

Note that in Fig. 1 three instead of four staticizers have been shown. The addition of another staticizer in Fig. 2 is assumed, the added staticizer being referred to as D staticizer and the individual digital values thereof being identified as $d$ and $\bar{d}$. Outputs from each of the detectors (still referring to both Figs. 1 and 2) are directed to points determined by the position of the stage in the system. That is, the outputs of the first and second inequality detectors 20, 22 are directed to the first and second inequality terminals 36, 38, and the output of the equality detector 24 is directed to the succeeding stage, or, if the stage is responsive to the lowest order digits, to the equality terminal 40. The inequality terminals 36, 38 have been designated in Fig. 2 in correspondence with the significance of the signals they carry. The first inequality terminal 36 has, therefore, been designated at the $a>b$, $a>c$, $a>d$ terminal, and the second inequality terminal 38 has been designated as the $a<b$, $a<c$, $a<d$ terminal.

The three detectors 20, 22, 24 within the stage shown may represent any of the stages in the system of Fig. 1. Accordingly, subscripts have not been employed to designate the stage or the order of digit. The overall arrangement thus comprises a plurality of stages similar to the one shown with the couplings between the stages, to the source of timing signals 32, to the source of selector signals 30, and to the terminals 36, 38, 40 of Fig. 1.

The arrangement employed in each detector comprises a number of "or" circuits and a single "and" gate. "Or" circuits, also termed mixers, are well known in the computing art. Hereinafter termed "or" gates, they have a number of inputs and provide output signals when input signals are applied to any one or more inputs. "And," also known as coincidence gates, are also well known in the computing art. Such gates, hereinafter termed "and" gates, have a number of inputs and provide an output signal when and only when all inputs have been activated by input signals.

The relationships of the digital signals applied to the "or" gates, and the arrangement of the "or" gates with respect to the "and" gates, provide a basis for making multiple comparisons. Each detector 20, 22, 24, in effect, tests the value of one digit with each of the other digits, in response to the different selector signals, to determine the relationship between characters.

The inputs applied to the first inequality detector "and" gate 46 are the outputs of first, second, and third "or" gates 48, 50, 52, reading counter-clockwise from the top around the "and" gate 46. The inputs to the first "or" gate 48 are X, $\bar{d}$, and Y, the inputs to the second "or" gate 50 are Z, $\bar{c}$, and X, and the inputs to the third "or" gate 52 are Z, $\bar{b}$, and X. In addition to the three inputs to the first inequality detector "and" gate 46 from the "or" gates 48, 50, 52, additional inputs are applied from the $a$ conductor, and from the source of timing signals 32 (or the previous equality detector 24). The first inequality detector "and" gate 46 thus has five inputs.

A seven input "and" gate 54 is employed in the equality detector 24. The outputs of six "or" gates 56 to 66, numbered from one to six from the top counter-clockwise around the "and" gate 54, are applied to the equality detector "and" gate 54. In addition, an input is applied from the source of timing signals 32 (or previous equality detector 24). The inputs to the various "or" gates 56 to 66 will herein be identified in sequence:

(1) First "or" gate 56—Z, $\bar{a}$, $b$, Y.
(2) Second "or" gate 58—Z, $a$, $\bar{b}$, Y.
(3) Third "or" gate 60—Z, $c$, $\bar{a}$, X.
(4) Fourth "or" gate 62—Z, $\bar{c}$, $a$, X.
(5) Fifth "or" gate 64—X, $a$, $\bar{d}$, Y.
(6) Sixth "or" gate 66—X, $\bar{a}$, $d$, Y.

A five input "and" gate 68 is employed in the second inequality detector 22. Three of the inputs are applied from the outputs of first, second, and third "or" gates 70, 72, 74, respectively, while one is derived from the source of timing signals 32 (or previous equality detector 24), and one is applied from the $\bar{a}$ conductor. Again numbering the "or" gates in counterclockwise fashion from the top around the "and" gate, the inputs to the "or" gates 70, 72, 74 are as follows:

(1) First "or" gate 70—Y, $d$, X.
(2) Second "or" gate 72—Z, $c$, X.
(3) Third "or" gate 74—Z, $b$, Y.

A second exemplification of the invention (refer to Fig. 3) is an arrangement for comparing each of two numbers with a third. The arrangement may be employed with a system employing two input magnetic tapes for a sorting process and the designations used correspond to such a sorting system. Two selection signals, AR and BR, may be employed in the system. In the sorting system these signals may also mean, respectively, that the A tape is running, and that the B tape is running. Digital signals from A and B characters are identified as $a$ and $b$, respectively, and digits from an additional character, with which A and B are to be compared, are termed R. The R character, in the sorting system, may represent the character which took precedence in the last comparison.

The overall arrangement of Fig. 3 is similar to that of Fig. 2. A first inequality detector 20, an equality detector 24, and a second inequality detector 22 are employed, each having inputs from the source of timing signals 32 (or the previous equality detector 24) and each providing an output. As with Fig. 2, the arrangement represents any one stage of a multi-stage comparator of the type of Fig. 1. The inputs (refer here also to Fig. 1) are derived from the source of selector signals 30 and the staticizers 10, 12, 14 on individual conductors again identified by the significance of the digital signal they carry. As in Fig. 2, the conductors carry signals which represent digit ($a$) and not digit ($\bar{a}$) values. The output of the first inequality detector 20 is directed to a first inequality terminal 36 identified functionally as the $a>$R and $b>$R terminal. The output of the second inequality detector 22 is applied to a second inequality terminal 38 identified functionally as the R$>a$ and R$>b$ terminal. The equality detector 24 output is applied to the succeeding stage or the equality terminal 40, depending upon the stage in which the equality detector 24 is employed.

The first inequality detector 20 comprises a four input "and" gate 78 to the inputs of which are applied: (1) The output of a first "or" gate 40, (2) the output of a second "or" gate 82, (3) signals from the source of timing signals 32 (or the previous equality detector 24), and (4) signals on the $\bar{\text{R}}$ conductor. The output of the first inequality detector "and" gate 78 represents the output of the detector 20. The inputs applied to the first "or" gate 80 are BR and $a$, and the inputs applied to the second "or" gate 82 are AR and $b$.

The equality detector 24 comprises a five input "and" gate 84 and four three input "or" gates. The "or" gates, identified with respect to the drawing as the first to fourth "or" gates 86, 88, 90, 92 (when read from the top counterclockwise around the "and" gate 84), provide outputs to separate inputs of the "and" gate 84. The fifth "and" gate 84 input is applied from the source of timing signals 32 (or the previous equality detector 24). The inputs to the "or" gates 86, 88, 90, 92 are arranged as follows:

(1) First "or" gate 86—BR, $\bar{a}$, R.
(2) Second "or" gate 88—BR, $a$, $\bar{\text{R}}$.
(3) Third "or" gate 90—AR, $b$, $\bar{\text{R}}$.

(4) Fourth "or" gate 92—AR, $\bar{b}$, R.

The second inequality detector 22, like the first, comprises two "or" gates 96, 98 and a four input "and" gate 94, the output of the last of which represent the output of the inequality detector 22. The outputs of the two "or" gates, here called the first and second "or" gates 96 and 98, respectively, are applied to two inputs of the "and" gate 94. The two remaining inputs of the "and" gate 94 receive signals from the source of timing signals 32 (or the previous equality detector 24) and the R conductor. The inputs to the first "or" gate 96 are made from BR and $\bar{a}$, and the inputs to the second "or" gate 98 are made from AR and $\bar{b}$.

Another arrangement (refer to both Figs. 1 and 4) provides comparison between any pair of three different characters. As previously, with respect to Figs. 2 and 3, the arrangement of Fig. 4 represents the detectors to be employed in the individual stages of the system of Fig. 1. Inputs to the detectors 20, 22, 24 are made from the source of timing signals 32 (or previous equality detector 24), the source of selector signals 30, and three staticizers 10, 12, 14, as previously explained. The outputs of the inequality detector 20 are applied to a first inequality terminal 36 designated functionally as the $a>b$, $b>c$, and $a>c$ terminal. The outputs of the second inequality detector 22 are applied to a second inequality terminal 38 designated functionally as the $a<b$, $b<c$, and $a<c$ terminal. The output of the equality detector 24 is applied to the succeeding stage, or to the equality terminal 40.

In the first inequality detector 20 there is one seven input "and" gate 102 and six three input "or" gates 104 to 114. The outputs of the "or" gates 104 to 114, which are grouped in the drawing around the "and" gate 102 and numbered successively from the top counter-clockwise around the "and" gate 102, are applied individually to the inputs of the "and" gate 102. The remaining "and" gate 102 input is derived from the source of timing signals 32 (or the previous equality detector 24). The inputs to the "or" gates 104 to 114 may be identified as follows:

(1) First "or" gate 104—Y, $\bar{b}$, Z.
(2) Second "or" gate 106—Y, *a*, Z.
(3) Third "or" gate 108—X, *b*, Y.
(4) Fourth "or" gate 110—X, $\bar{c}$, Y.
(5) Fifth "or" gate 112—X, *a*, Z.
(6) Sixth "or" gate 114—X, $\bar{c}$, Z.

The output of the first inequality detector "and" gate 102 represents the output of the first inequality detector 20.

The equality detector 24 comprises an arrangement somewhat similar to the first inequality detector 20, having six "or" gates 118 to 128 coupled to individual inputs of a seven input "and" gate 116. The "or" gates 118 to 128 are numbered from one to six in similar fashion to those of the first inequality detector 20, but each is a four input, instead of a three input, "or" gate. The inputs to these "or" gates 118 to 128 are arranged as follows:

(1) First "or" gate 118—Y, $\bar{a}$, *b*, Z.
(2) Second "or" gate 120—Y, *a*, $\bar{b}$, Z.
(3) Third "or" gate 122—X, *b*, $\bar{c}$, Y.
(4) Fourth "or" gate 124—X, $\bar{b}$, *c*, Y.
(5) Fifth "or" gate 126—X, *a*, $\bar{c}$, Z.
(6) Sixth "or" gate 128—X, $\bar{a}$, *c*, Z.

The remaining input to the equality detector "and" gate 116 is applied from the source of timing signals 32 (or the previous equality detector 24) and the output of the "and" gate 116 represents the output of the equality detector 24.

The second inequality detector 22 has, as does the first inequality detector 20, six three input "or" gates 132 to 142 and one seven input "and" gate 130. The "or" gates 132 to 142 are numbered similarly to those of the first inequality detector 20 and each provides an output to a different input of the "and" gate 130. The other input of the "and" gate 130 is provided from the source of timing signals 32 (or the previous equality detector 24). The output of the "and" gate 130, which is the output of the second inequality detector 22, is coupled to the second inequality terminal 38, which is functionally designated as the $a<b$, $b<c$, and $a<c$ terminal. Inputs are applied to the "or" gates 132 to 142 in the following arrangement:

(1) First "or" gate 132—Y, *b*, Z.
(2) Second "or" gate 134—Y, $\bar{a}$, Z.
(3) Third "or" gate 136—X, $\bar{b}$, Y.
(4) Fourth "or" gate 138—X, *c*, Y.
(5) Fifth "or" gate 140—X, $\bar{a}$, Z.
(6) Sixth "or" gate 142—X, *c*, Z.

In operation (refer now to Figs. 1 and 2), each arrangement effects successive comparisons between given pairs of a number of characters. The comparison which is to be made is chosen by the selector signal which is provided.

As stated previously, the arrangement of Fig. 2 compares a digit *a* of a character A with individual digits *b*, *c*, and *d* of other characters B, C, and D, respectively. The arrangement of Fig. 1, which includes $n+1$ number of the arrangements of Fig. 2 makes the overall determination between character A and the other characters B, C, and D. The staticizers for the various characters, A staticizer 10, B staticizer 12, C staticizer 14, and an additional staticizer for character D (not shown in Fig. 1) generate the individual digital values for the various characters. The source of timing signals 32 provides a single signal to effect the comparison, when information is properly presented by the staticizers 10, 12, 14. At the time the source of timing signals 32 provides a signal, the source of selector signals 30 also provides one of three selector signals X, Y, and Z.

The general fashion of operation of the arrangement of Fig. 1 is to test digits successively in correspondence to the order of value the digits represent. First one pair, say *a* and *b*, of digits are compared as one selector signal, say X, is provided. Then a second comparison is made between *a* and *c* as another selector signal Y is provided, and finally a comparison is made between *a* and *d* as a selector signal Z is provided. If the digits compared during one comparison in a stage are equal, the equality detector 24 provides an output to the succeeding stage. The equality detector 24 output, therefore, acts as a timing signal for each detector 20, 22, 24 of the succeeding stage. Where an inequality is detected at a stage the inequality detector 20 or 22 provides an output directly to the corresponding inequality terminal 38 or 40. Therefore, no timing signal is available for the succeeding stages, and the comparison is stopped at the highest order digits which are unequal. Since the stages are coupled in descending fashion from the highest order, no further comparison is needed. If all digits are equal the timing signal passes through all stages to the equality terminal 40.

The particular arrangement, referring now to Fig. 2, by which a digit *a* may be compared with each of the number of other digits *b*, *c*, and *d* makes use of the particular advantages of the binary system of notation in representing and manipulating information, and in physically implementing the representation and manipulation. As stated previously, the existence of a binary "1" digit is represented by a signal in one of two conductors, while the absence of the binary "1" digit (binary "0") is represented by a signal in the other of the two conductors. When a digital signal *a* is tested with a digital signal *b*, the coincident presence of signals on the *a* conductor and on the *b* conductor indicates that both *a* and *b* are present (are binary "1"). If a signal is present on the *a* conductor and on the $\bar{b}$ conductor, this coincidence indicates that $a$ is binary "1" but that $b$ is binary "0," so that $a$ is greater than $b$. When the signals exist on the conductors which indicate the reverse relationship, that is, $\bar{a}$ and $b$, (or "not $a$" and $b$) the reverse is true and $b$ is greater than $a$.

These relationships, together with selector signals, are applied to particular configurations of "or" and "and" gates to detect the desired relationships in each inequality detector 20 and 22 and in each equality detector 24. An "and" gate must have signals on all its inputs before it will provide an output. Thus the first inequality detector "and" gate 46 must have five input signals, one from the source of timing signals 32 (or previous equality detector 24) another from the $a$ conductor and three others from the first, second, and third "or" gates 48, 50, 52. To observe the operation of the first inequality detector 20 in comparing $a$ with $b$, assume that the X selector signal, and the timing signal are provided. Assume also that digit $a$ has a digital value of binary "1," so that the $a$ conductor is activated and an input signal provided to the corresponding input of the "and" gate 46. The presence of the X selector signal activates both the first and second "or" gates 48 and 50, which provide outputs to the corresponding inputs of the "and" gate 46. All inputs of the "and" gate 46 are, therefore, activated except for that input responsive to the third "or" gate 52. Activation of this particular input is dependent only on the presence of a signal on the $\bar{b}$ conductor since the Z and Y signals are not present. If the $\bar{b}$ conductor is activated by the B staticizer 12 the third "or" gate 52 provides an output, all inputs of the "and" gate 46 are activated and a signal is provided from the "and" gate 46 and from the first inequality detector 20 to the coupled inequality terminal 36. Since the "and" gate 46 detects coincidence between $a$ and $\bar{b}$ the "and" gate 46 signals that $a$ is greater than $b$, and the first inequality terminal 20 is correspondingly identified in Fig. 2 as the $a>b$ terminal.

Note that in the first inequality detector 20 of Fig. 2 the arrangement is such that a similar comparison may be made to detect coincidence between $a$ and $\bar{c}$ or $\bar{d}$. The presence of a Y selector signal activates the first and third "or" gates 48 and 52, permitting comparison between the values of the digits for character A and character C, while the provision of a selector signal Z effectuates comparison between digits of character A and character D. The selector signals may be said to disable unwanted comparisons, or to over-ride unwanted comparisons.

The equality detector 24 of Fig. 2 employs the selector signals in the same fashion as the first inequality detector 20. The presence of a selector signal provides an output from the "or" gates to which the selector signal is applied, leaving only two "or" gates to provide outputs reflecting a digital value of the digits than being tested. Since the equality detector 24 employs six "or" gates 56 to 66, it will be evident that each selector signal X, Y, and Z activates four "or" gates. For example, the X selector signal activates the third, fourth, fifth, and sixth "or" gates 60, 62, 64, 66, respectively. Another input is provided to the equality detector "and" gate 24 from the source of timing signals 32 (or the previous equality detector 24), so that only the inputs to the "and" gate 54 which are responsive to the first and second "or" gates 56, 58 are not activated by selector signals. These first and second "or" gates 56, 58, however, may both be activated if the values of the corresponding digits are both one or both zero. The first and second "or" gates 56, 58 will not be activated if the digital values are unlike. The coincident existence of signals on $a$ and $\bar{b}$ or on $\bar{a}$ and $b$ conductors activates two inputs of only the first or second "or" gates 56, 58, but provides no inputs to the other "or" gate. Therefore, one input of the equality detector "and" gate 54 is not activated and the "and" gate 54 does not provide an output. Stated in another way, in order to activate the first and second "or" gates 56, 58 at the same time both the $a$ and $b$ conductors or both the $\bar{a}$ and $\bar{b}$ conductors must be activated at the same time. This requires that both digits be binary "1" or that both digits be binary "0."

The second inequality detector 22 tests a digit for character A against the corresponding digits for characters B, C, and D in response to selector signals and in similar fashion to the first inequality detector. On application of the X selector signal the second inequality detector "and" gate 68 detects coincidence between signals on the $\bar{a}$ conductor and the $b$ conductor, which coincidence indicates $a$ to be less than $b$. The signal is, therefore, provided from the second inequality detector "and" gate 68 to the $a<b$ terminal. Similarly, application of the Y and the Z selector signals permits detection of coincidence between $\bar{a}$ and $c$, and between $\bar{a}$ and $d$.

If, in Fig. 2, an X, Y, Z sequence of selector signals is employed, the digits for character A are tested successively against the digits for characters B, C, and D. The equality and inequality signals appearing at the terminals 36, 38, 40 (of Fig. 1) thus successively reflect the overall results of the comparisons of character A with B, C, and D.

Note that in Fig. 2 each of the six "or" gates 56 to 66 in the equality detector 24 will be activated if the $a$, $b$, $c$, and $d$ conductors are all activated, or if the $\bar{a}$, $\bar{b}$, $\bar{c}$, and $\bar{d}$ conductors are all activated. Such conditions would indicate respectively that $a$, $b$, $c$, and $d$ are all binary "1," and that $a$, $b$, $c$, and $d$ are all binary "0." In the absence of selector signals and the presence of a timing signal, therefore, a four-way equality is detected by the system.

A second exemplification (refer now to Figs. 1 and 3) is the arrangement for comparison of a given character with each of only two other characters. The character here chosen as the standard for comparison is designated by R, since in a sorting scheme the standard may represent a result from a previous sorting operation. The digits of character R are also represented as R. Selector signals are designated as AR or BR in order to represent the input tapes employed during the selection, as stated previously.

In the example shown, the first inequality detector 20 provides signals when R is less than $a$ and R is less than $b$. The logic employed follows that previously described in relation to Fig. 2. Specifically, when the A tape is running R is to be compared with $a$ and an AR selection signal is provided. The first inequality detector "and" gate 78 then signals coincidence between a signal on the $\bar{R}$ conductor and a signal on an $a$ conductor. Such a coincidence indicates that the digit for character R is binary "0" and that the digit for character A is binary "1," that therefore R is less than $a$. Similarly, when the B tape is running the BR selector signal is provided and coincidence between $b$ and $\bar{R}$, if it exists, is signalled by the first inequality detector "and" gate 78. In this event R is less than $b$.

The operation of the equality detector 24 of Fig. 3 is similar to the operation of equality detector of Fig. 2, with the exception that since one less character is involved, four "or" gates and two selector signals are employed in Fig. 3, as against six "or" gates and three selector signals in Fig. 2. Functionally, however, the operations are alike, since the selector signals activate all inputs of the equality detector "and" gate 84 but two, which two inputs are used to detect coincidence between the values of the two digits being tested.

The second inequality detector 22 of Fig. 3 has an arrangement similar to the first inequality detector 20, except that the coupled conductors have the opposite binary significance to those of the first inequality detector 20.

Thus, coincidence is detected by the second inequality detector 22 between signals on the R and $\bar{a}$ conductors, and signals on the R and $\bar{b}$ conductors, as desired. The outputs of the second inequality detector "and" gate 94, which are the outputs of the second inequality detector 22, are therefore provided to the $R>a$ and $R>b$ terminal. As in the arrangement of Fig. 2, the arrangement detects a condition in which $a=b=R$ when a timing signal, but no selector signal, is present.

A third arrangement (refer to Figs. 1 and 4) may be employed where it is desired to compare any given pair of three characters. The arrangement of Fig. 4 bears the same relationship to Fig. 1 as the arrangements of Figs. 2 and 3. The arrangement of the various stages, the employment of a source of timing signals 32 and a source of selector signals 30, and a utilization of A, B, and C staticizers correspond to Fig. 1 and the generalized description previously given with respect to that figure.

In accordance with the general program of operation previously stated, the first inequality detector 20 makes successive comparisons between chosen pairs of digits of the characters in response to selector signals. Because the significance and relationships of the digital values and the selector signals have been explored in detail previously, extended analysis of the configurations within the detectors 20, 22, 24 of Fig. 4 will not be made. Note, however, that when an X selector signal is present coincidence is detected between signals on the $a$ and $\bar{b}$ conductors, that when a Z selector signal is present coincidence is detected between signals on the $b$ and $\bar{c}$ conductors, and that when a Y selector signal is present coincidence is detected between signals on the $a$ and $\bar{c}$ conductors in the first inequality detector 20.

The equality detector 24 operates in a manner similar to the previously described operation of the equality detector of Fig. 2. It should be noted, however, that the designation of the inputs and selector signals is in a different order in Fig. 4 than in Fig. 2. The second inequality detector 22 detects three relationships between the values of the digits of the characters to be compared: (1) When an X selector signal is present, coincidence is detected between signals on the $\bar{a}$ and $b$ conductors, (2) when a Z selector signal is present, coincidence is detected between signals on $\bar{b}$ and $c$ conductors, and (3) when a Y selector signal is present, coincidence is detected between signals on the $\bar{a}$ and $c$ conductors. Outputs from the second inequality detector, therefore, indicate any of these conditions: That $a<b$, that $b<c$, and that $a<c$. Again, as with the arrangements of Figs. 2 and 3, this arrangement detects $a=b=c$ with no selector signal present.

The invention provides configurations of gates and detectors for effecting successive comparisons of characters in descending order from the highest order digits of the characters to be compared. The comparisons are simple, and exact. Further, the circuit elements which are employed are uniform in basic design and economical to construct. "Or" and "and" gates constructed of rectifying elements may be advantageously employed in this application, but, if desired, vacuum tube elements may also be employed. The rapidity and reliability of the arrangement is not adversely affected by the use of either type of construction.

What is claimed is:

1. A system for comparing a plurality of blocks of information signals having unit signals of different orders of value, said system comprising a plurality of means for comparing unit signals from said blocks of information signals, each of said means being responsive to the unit signals representing a different order of value from said blocks of information signals, means for selectively providing selector signals and coupled to and controlling said comparing means for selecting certain ones of said blocks to be compared in said comparing means in response to the selected selector signal, and means responsive to said comparing means for providing a different signal for each of the three conditions of equality and relative inequality between selected blocks of signals indicating the relative magnitude of said selected blocks.

2. A system for comparing a plurality of groups of characters each comprising signals representing individual binary valued digits of different order, said system comprising means to provide timing signals, means to provide a plurality of selector signals in separate paths, a plurality of stages, each of said stages being responsive to the digital values of one different order of digit signals from said characters and to said selector signals, and comprising means for comparing desired pairs of signals representing said binary digits and deriving a different signal for each of the three conditions of equality and relative inequality between said digits, the stage responsive to the highest order of digit signals being responsive also to said timing signals and each other stage being responsive to equality signals from the stage responsive only to the next higher order of digit signals, said system also comprising terminal means coupled to said stages for signalling by the occurrence of signals on said terminal means the relationship between said characters.

3. A system for comparing signals representing a plurality of characters each comprising individual binary digits of different order, said system comprising means to provide a plurality of selector signals in separate paths, a plurality of digit-comparing stages, each of said stages being responsive to said selector signals and to the signals representing the value of digits of one different order from said characters, and each stage comprising means for comparing desired pairs of said signals representing binary digits and for signalling conditions of equality and relative inequality between said digits, said system also comprising means coupling said stages to actuate said stages sequentially in descending fashion on receipt of equality signals from the prior stage responsive to a higher order of digits.

4. A system for comparison of signals representing a plurality of characters each of which is composed of signals representing a plurality of individual digits of different order, said system comprising means to provide timing signals, means to provide individual selector signals, and a plurality of individual stages, each of said stages being responsive to the value of like digit signals from the different characters and to said source of individual selector signals, and comprising means responsive to given combinations of values of said digit signals and said selector signals for signalling conditions of equality and relative inequality between the digits of two given characters, the stage responsive to the highest order digits being also responsive to the source of timing signals, and each other stage being responsive to signals of a condition of equality from the stage responsive to the next higher order digits.

5. A system for comparing a plurality of characters, each of said characters comprising signals representing a plurality of binary valued digits of different order, means for providing a selected one of three selector signals, said system comprising a plurality of stages for determining the relationship of the digit signals at each order of value, each of said stages being responsive to the value of the digits of a different given order from said characters and comprising (1) means selectively operable in response to a first of said selector signals to detect equality in the value of the digits from predetermined pairs of characters, (2) means selectively operable in response to a second of said selector signals to detect a condition in which the value of a first digit is greater than the value of a second digit from said predetermined pairs of characters, and (3) means selectively operable in response to the third of said selector signals to detect a condition in which the value of a first digit is less than the value of a second digit from said predetermined pairs of characters, said system also comprising means coupled to said plurality of stages to select from said plurality of characters successively different pairs of said characters for comparison, means to provide timing signals, the stage of said plurality of stages responsive to the highest order digits being also responsive to said timing signals and each other stage being responsive to the equality detecting means in the stage responsive to the next higher order digits, and terminal means coupled to said stages, the existence of signals upon which terminal means indicate the relationship among said plurality of characters.

6. A system for comparing a plurality of signals representing characters, each of said characters comprising a plurality of signals representing binary valued digits of different order, said system comprising a plurality of stages for determining the relationship of the digits at each order of value, each of said stages being responsive to the value of the digits of a different given order from said characters and comprising (1) means selectively operable to detect equality in the value of the digits from selected pairs of characters, (2) means selectively operable to detect a condition in which the value of a first digit is greater than the value of a second digit from said selected pairs of characters, and (3) means selectively operable to detect a condition in which the value of a first digit is less than the value of a second digit from said selected pairs of characters, said system also comprising means for selectively providing selector signals to which said selectively operable means are responsive and coupled to said plurality of stages to select a pair of characters for comparison from among said plurality of characters, means coupling said stages in a descending sequence from the stage responsive to the value of the digits of the highest order, and means responsive to said detecting means in said stages for deriving an output signal from one of (1) the means which detect inequality conditions within said stages, and (2) said means for detecting equality in the stage responsive to the value of the digits of lowest order.

7. A system for comparing signals representing a given character with each one of a plurality of signals representing other characters and for signalling (1) a condition of equality between said given character and one of said other characters, (2) a condition in which said given character is greater than one of said other characters, (3) a condition in which said given character is less than one of said other characters, each of said characters comprising a plurality of signals representing binary valued digits arranged in descending order, said system comprising means to provide individual signals to select said digits to be compared, means to provide timing signals, and a plurality of stages, each of said stages being responsive to the digital values of the digits of a different order in said characters, each of said stages comprising (1) means for detecting and signalling a condition of equality between the digit of said given character and the corresponding digit of any one of said other characters, (2) means for detecting and signalling a condition of relative inequality in which the digit of said given character is greater than the corresponding digit of one of said other characters, and (3) means for detecting and signalling a condition of relative inequality in which the digit of said given character is less than the corresponding digit of one of said other characters, each one of said detecting and signalling means being operable to compare successively the digit from said given character with each of said corresponding other character digits in response to selector signals, the stage which is responsive to the values of the digits of the highest order being also responsive to said timing signals, each other stage being responsive to the means for signalling equality in the stage responsive to the values of the digits of the next higher order.

8. A system for comparing signals representing a given character with each of a plurality of signals representing other characters, each of said characters comprising signals representing a plurality of binary valued digital positions of varying order, said system comprising means to provide timing signals, means to provide selector signals for testing said given character with different ones of said other characters, a plurality of stages, each of said stages determining the relative magnitude of the digits at a different order, each of said stages being responsive to said selector signals and comprising (1) means selectively operable to test the digit from said given character with an individual digit from one of the other characters to determine and to signal equality between said digits, (2) means selectively operable to test the digit of said given character with an individual digit from one of the other characters to detect and signal a condition in which the digit from said given character is less than the corresponding digit of said other character, and (3) means selectively operable to test the digit of said given character with an individual digit from one of said other characters to detect and signal a condition in which the digit from said given character is greater than corresponding digit of said other character, said stages being cascaded in correspondence to the order of value they represent, each stage responsive to a lower order of digit being responsive to an equality signal from the stage from the next higher order, and the stage responsive to the highest order of digit being responsive to said timing signals, said system also including terminal means coupled to said stages for representing conditions of equality and conditions of relative inequality between said characters.

9. The invention as set forth in claim 8, wherein each said means for testing the signals representing the digits from said characters to determine and to signal the relationship of said digits includes a plurality of mixer means and a coincidence detecting means responsive to said plurality of mixer means, each of said mixer means being responsive to predetermined combinations of the values of said digits and said selector signals such that each coincidence detecting means provides an output in response only to a predetermined relationship between said tested digits.

10. The invention as set forth in claim 9, said system operating to compare signals representing a given character with other signals representing any one of three other characters, and wherein said selector signals comprise first, second, and third selector signals, each said mixer means comprises an "or" gate, and each said coincidence detecting means comprises an "and" gate.

11. The invention as set forth in claim 9, said system operating to compare signals representing a given character with other signals representing any one of two other characters, and wherein said selector signals comprise first and second selector signals, each said mixer means comprises an "or" gate, and each said coincidence detecting means comprises an "and" gate.

12. A system for determining the order of precedence of signals representing a plurality of characters, each of said characters comprising a plurality of signals in binary valued digital positions of varying order, said system comprising means to provide timing signals, means to provide selector signals to determine successively given pairs of characters to be tested, a plurality of stages, each of said stages responding to and determining the relative magnitude of the value of the digits of a different order, each of said stages being responsive to said selector signals and comprising (1) means selectively operable to test the values of digits from said selected pair of characters and to signal equality between said digits, (2) means selectively operable to test the values of digits of said selected pair of characters to signal a relationship in which a first of said digits is greater than the other digit of said pair, and (3) means selectively operable to test the values of digits of said selected pair to signal a relationship in which a first of said digits is less than the other digit of said pair, said stages being cascaded in correspondence to the digital orders of value to which they are respectively responsive, each stage which is responsive to lower order digits being also responsive to an equality signal from the stage responsive to the next higher order digits and the stage responsive to the highest order digits being also responsive to said timing signals, said system also including terminal means coupled to said stages for representing conditions of equality and conditions of relative inequality between said characters.

13. The invention as set forth in claim 12, wherein each said means for testing the values of the signals representing the digits from said characters to determine and to signal the relationship of said digits each includes a plurality of mixer means and a coincidence detecting means responsive to said plurality of mixer means, each of said mixer means being responsive to predetermined combinations of the values of said digits and said selector signals such that each coincidence detecting means provides an output in response only to a predetermined relationship between said tested digits.

14. The invention as set forth in claim 13, said system operating successively to determine the order of precedence between each possible pairing of signals representing three given characters, and wherein said selector signals comprise first, second, and third selector signals, each said mixer means comprises an "or" gate, and each said coincidence detecting means comprises an "and" gate.

15. In a data-processing system employing signals representing characters A, B, C, and D each respectively composed of a plurality of signals representing digits *a*, *b*, *c*, and *d* having "digit" and "not digit" binary values in different orders and including means for generating X, Y, and Z selector signals and means for generating timing signals, an arrangement for comparing A with B, C, or D comprising a plurality of stages, each of said stages including an equality detector, a first inequality detector, and a second inequality detector, each stage being responsive to the values of the digits of a different order, the detectors of the stage responsive to the highest order digit being responsive also to said timing signals, the detectors of each succeeding stage being responsive to the equality detector of the next previous stage, the equality detector for each of said stages comprising an "and" gate having a first input activated by Z, Y, not *a*, or *b* signals, a second input activated by Z, Y, *a*, or not *b* signals, a third input activated by Z, X, *c*, or not *a* signals, a fourth input activated by Z, X, not *c*, or *a* signals, a fifth input activated by X, Y, *a*, or not *d* signals, and a sixth input activated by X, Y, not *a*, or *d* signals, the first inequality detector for each of said stages comprising an "and" gate having a first input activated by X, Y, or not *d* signals, a second input activated by Z, X, or not *c* signals, a third input activated by Z, Y, or not *b* signals, and a fourth input activated by *a* signals, and the second inequality detector comprising for each of said stages an "and" gate having a first input activated by Y, X, or *d* signals, a second input activated by Z, X, or *c* signals, a third input activated by Z, Y, or *b* signals, and a fourth input activated by not *a* signals, said arrangement also comprising an equality terminal coupled to the equality detector of the lowest order stage, a first inequality terminal coupled to the first inequality detectors of each of the stages, and a second inequality terminal coupled to the second inequality detectors of each of the stages.

16. In a data-processing system employing signals representing characters A, B, and C each respectively composed of a plurality of signals representing digits *a*, *b*, and *c* having "digit" and "not digit" binary values in different orders and including means for generating Y and Z selector signals and means for generating timing signals, an arrangement for comparing A with B or C comprising a plurality of stages, each of said stages including an equality detector, a first inequality detector, and a second inequality detector, each stage being responsive to the values of the digits of a different order, the detectors of the stage responsive to the highest order digit being responsive also to said timing signals, the detectors of each succeeding stage being responsive to the equality detector of the next previous stage, the equality detector for each of said stages comprising an "and" gate having a first input activated by Z, not *b*, or *a* signals, a second input activated by Z, *b*, or not *a* signals, a third input activated by Y, *c*, or not *a* signals, and a fourth input activated by Y, not *c*, or *a* signals, the first inequality detector for each of said stages comprising an "and" gate having a first input activated by Z or *b* signals, a second input activated by Y or *c* signals, and a third input activated by not *a* signals, and the second inequality detector for each of said stages comprising an "and" gate having a first input activated by Z or not *b* signals, a second input activated by Y or not *c* signals, and a third input activated by *a* signals, said arrangement also comprising an equality terminal coupled to the equality detector of the lowest order stage, a first inequality terminal coupled to the first inequality detectors of each of the stages, and a second inequality terminal coupled to the second inequality detectors of each of the stages.

17. In a data-processing system employing signals representing characters A, B, and C each respectively composed of a plurality of signals representing digits *a*, *b*, and *c* having "digit" and "not digit" binary values in different orders and including means for generating X, Y, and Z selector signals and means for generating timing signals, an arrangement for comparing any character with any other character comprising a plurality of stages, each of said stages including an equality detector, a first inequality detector, and a second inequality detector, each stage being responsive to the values of the digits of a different order, the detectors of the stage responsive to the highest order digit being responsive also to said timing signals, the detectors of each succeeding stage being responsive to the equality detector of the next previous stage, the equality detector for each of said stages comprising an "and" gate having a first input activated by Y, Z, not *a*, or *b* signals, a second input activated by Y, Z, *a*, or not *b* signals, a third input activated by X, Y, *b*, or not *c* signals, a fourth input activated by X, Y, not *b*, or *c* signals, a fifth input activated by X, Z, *a*, or not *c* signals, and a sixth input activated by X, Z, not *a*, or *c* signals, the first inequality detector for each of said stages comprising an "and" gate having a first input activated by Y, Z, or not *b* signals, a second input activated by Y, Z, or *a* signals, a third input activated by X, Y, or *b* signals, a fourth input activated by X, Y, or not *c* signals, a fifth input activated by X, Z, or *a* signals, and a sixth input activated by X, Z, or not *c* signals, and the second inequality detector for each of said stages comprising an "and" gate having a first input activated by Y, Z, or *b* signals, a second input activated by Y, Z, or not *a* signals, a third input activated by X, Y, or not *b* signals, a fourth input activated by X, Y, or *c* signals, a fifth input activated by X, Z, or not *a* signals, and a sixth input activated by X, Z, or *c* signals, said arrangement also comprising an equality terminal coupled to the equality detector of the lowest order stage, a first inequality terminal coupled to the first inequality detectors of each of the stages, and a second inequality terminal coupled to the second inequality detectors of each of the stages.

References Cited in the file of this patent

UNITED STATES PATENTS

| | | |
|---|---|---|
| 2,318,591 | Conffignal | May 11, 1943 |
| 2,580,768 | Hamilton et al. | Jan. 1, 1952 |
| 2,589,130 | Potter | Mar. 11, 1952 |
| 2,623,171 | Woods-Hill | Dec. 23, 1952 |

FOREIGN PATENTS

| | | |
|---|---|---|
| 1,005,754 | France | Apr. 15, 1952 |
| 1,040,913 | France | May 27, 1953 |
| 688,049 | Great Britain | Feb. 25, 1953 |